July 10, 1934.  I. M. CRAFTS  1,965,936
GOVERNOR
Filed March 5, 1932
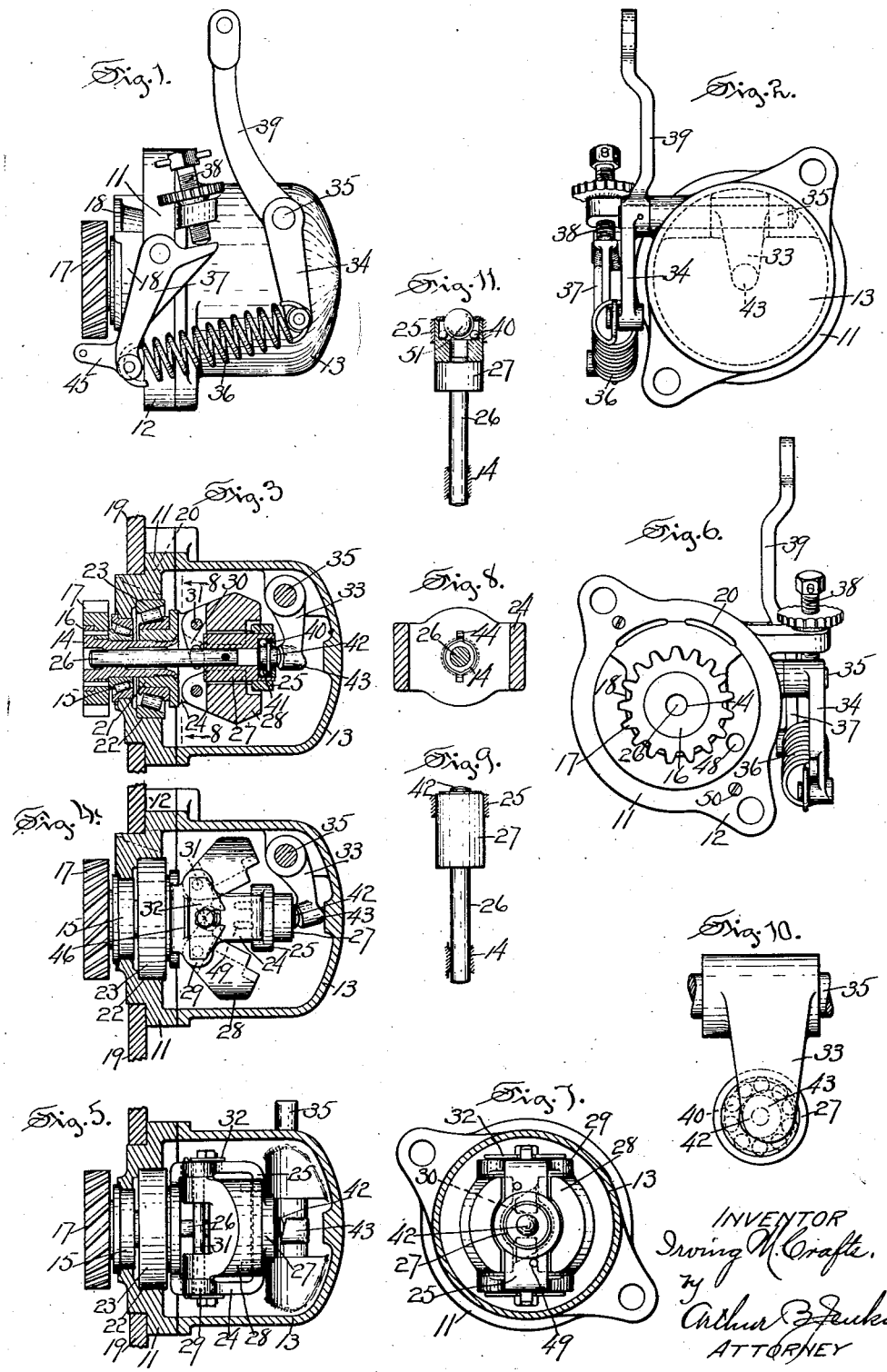

Patented July 10, 1934

1,965,936

UNITED STATES PATENT OFFICE 1,965,936

GOVERNOR

Irving M. Crafts, Portland, Conn., assignor to The Pickering Governor Company, Portland, Conn., a corporation of Connecticut Application March 5, 1932, Serial No. 597,042

14 Claims. (Cl. 264—15)

My invention relates to the class of devices which are commonly employed for regulating the speed of various kinds of motors used in the production of power, and an object of my invention, among others, is the production of a governor of extreme simplicity as to the arrangement and number of parts, such parts being so formed and arranged that they may be readily assembled, and when so assembled will produce a small and compact device that may be produced at a minimum expense and which will be particularly effective in operation.

One form of a governor embodying my invention and in the construction and use of which the objects herein set out, as well as others, may be attained is illustrated in the accompanying drawing, in which,—

Figure 1 is side view of my improved governor.

Figure 2 is an end view of the same.

Figure 3 is a view in central lengthwise section.

Figure 4 is a view similar to Figure 3 but with some of the parts shown in full.

Figure 5 is a view in central lengthwise section viewed from a point located at right angles to the point of view of Figure 3.

Figure 6 is an end view looking in the opposite direction from the point of view of Figure 2.

Figure 7 is a view in cross section on a plane cutting substantially across the ends of the weight supporting frame.

Figure 8 is a view in section on a plane denoted by the dotted line 8—8 of Figure 3.

Figure 9 is a detail side view of the governor shaft.

Figure 10 is a view on enlarged scale illustrating the arrangement of the actuating lever relatively to the head of the governor shaft.

Figure 11 is a detail view showing an alternative form of the connection between the governor shaft and the actuating lever.

In the accompanying drawing the numeral 11 denotes the base or mount of my improved governor, such base having ears 12 serving as a means for attachment as to the crank case of an engine. A housing 13 is secured to the mount as by means of the bolts employed for securing the mount in position, ears corresponding with those on the mount projecting from the bottom edge of the housing and having holes to receive the bolts which are passed through the holes in the mount and housing to secure the structure in position.

A supporting sleeve 14 is rotatably mounted in an opening through the mount into the chamber in the mount housing, said sleeve projecting on both sides of the mount and preferably being supported by roller bearings 15 secured in any suitable manner in the opening in the mount. A flange 16 is formed on the projecting outer end of the sleeve and a driving gear 17 having a recess to receive said flange is secured to the sleeve as by means of pins passing through the flange and gear, and as shown in Figure 3 of the drawing.

A boss 18 is formed on the bottom of the mount and said boss may be recessed at its axial center to receive a flange on the roller bearings 15. When the mount 11 is secured in place the gear 17 will be located within the engine case 19 to mesh with a gear as on the timing shaft of the engine, and ports 20 extend through the mount to the interior of the housing to receive lubricant from within the engine case, which lubricant will be splashed on to the boss and will flow into the ports, such splashing being caused by the operation of movable parts within the engine case. This lubricant will be collected within the housing 13 and serve to lubricate the parts therein.

A hub 21 of a weight supporting frame extends into a recess 22 on the inner surface of the mount 11, and roller bearings 23 being secured in said recess, if desired, will act to facilitate rotation of said frame within the housing. This frame comprises sides 24 extending from the hub in spaced relation and joined at their ends opposite the hub by a cross piece 25 constituting a support for the enlarged end of a governor shaft 26.

This enlarged end comprises a head 27 loosely fitting in the cross piece 25 and having a hole within which the end of the shaft 26 is received and secured as by means of a pin projecting through the head and shaft, and as shown in Figure 3 of the drawing. The opposite end of the shaft 26 extends into and preferably substantially through the sleeve 14, and said sleeve is secured within the hub 21 of the weight supporting frame as by means of interengaging screw threads. This sleeve is preferably counterbored from its inner end and is recessed at its opposite end, leaving a reduced portion between said recess and counterbore to serve as a bearing for the shaft 26.

Governor weights 28 are pivotally mounted between ears 29 extending laterally from opposite sides of the base of each of the sides 24, these weights having considerable thickness and being of a width to fit between the sides 24. Notches are formed in the outer ends of the weights to receive the cross piece 25 of the supporting frame, and an actuating toe 30 projects from the pivoted end of each weight and underlies the end of the head 27 of the governor shaft.

Pins 31 which serve as pivots for the weights 28 have their inner ends terminating short of the outer surfaces of the ears 29, and retainers 32 in the form of plates overlap the ends of the pins to secure them in place, said retainers being held in place as by means of bolts threaded into the sides 24 at the bases thereof.

An actuating lever comprising arms 33 and 34, and an actuating shaft 35 to opposite ends of which said arms are connected, is mounted in the housing 13 to be actuated by endwise movement of the shaft 26, including its enlarged head 27. A spring 36 secured at one end to the outer end of the arm 34 and at its opposite end to a tensioning lever 37 pivotally supported at the edge of the mount 11 is employed to swing said actuating lever in one direction. An adjusting screw 38 mounted in a lug projecting from the side of the housing 13 serves as a means for operating the tensioning lever to vary the tension of said spring. A rocker arm 39 secured to the shaft 35 is arranged for connection with a throttle member or similar device as a means for actuating the latter by the operation of the governor in a manner that will be readily understood.

In the operation of the device, the connection of the weight supporting frame with the engine by means of the gear 17 causes said frame to be rotated and the weights 28 to be revolved, the latter being swung outwardly by centrifugal force causing the toes 30 to move the head 27 of the governor shaft outwardly, thereby rocking the actuating lever to effect a closing movement of the throttle to retard the speed of the engine in a manner that will be readily understood, and contrariwise, if the speed of the engine slackens too much the spring 36 acting upon the arm 34 of the actuating lever will operate to open the throttle to accelerate the speed of the engine, this opening movement also being governed and controlled by the governor weights.

It will now have been noted that the connection of the actuating lever with the throttle and the pull of the spring 36 thereon imposes considerable resistance to outward movement of the arm 33 of said actuating lever, and I have therefore devised a connection between said arm and the head 27 of the governor shaft that will reduce the friction between said head and arm to a minimum, this connection being in the form of a ball bearing connected with the arm 33 in a particular manner. In arranging this connection I provide a recess in the end of the head 27 of the governor shaft and place a ball bearing 40 therein. This bearing is of the thrust type and comprises a stud 41 having a flange intermediate its ends with the balls located between such flange and the bottom of said recess. This stud has a projecting end that is preferably rounded to engage a head 43 constituting the end of the arm 33. The endwise movement of the governor shaft effects a swinging movement of the arm 33 on its pivot comprising the shaft 35, and in this swinging movement the head 43 moves laterally with respect to the axis of the governor shaft. In order that the ball bearings may aid in this movement and minimize friction which would be created by a rubbing action between the heads 27 and 43 the latter is caused to make contact with the end 42 of the stud on a radius of the latter, in the particular arrangement herein shown the end 42 of the stud being rounded and the contacting surface on the under side of the head being beveled so that contact between the two parts is made with the rounded end of the stud pressing against the under side of said head on a line between the axis and periphery of the stud. The ball bearing may be covered by a plate having a hole through which the end 42 extends if desired.

This causes the force of resistance during swinging movement of the arm 33 to be applied to the stud in a manner to effect its rotation, with a result that the balls of the ball bearing are caused to have a rolling action on the flange of the stud and the bottom of the recess in the end of the head 27 of the governor shaft, thereby eliminating sliding friction between the stud and the head 43 of the arm 33.

In order that the bearings and other parts of the mount 11 may be relatively positioned to properly function, and this without requiring undue nicety in workmanship, which is expensive, I have provided means whereby proper adjustments may be readily effected when the parts are being assembled, and this with little trouble and waste of effort or time. To effect this purpose the sleeve 14 is threaded into a hole in the hub 21 of the weight supporting frame, and in assembling the parts the sleeve is screwed into place to an extent to secure the proper adjustment and then the mouth of the counterbore hereinbefore referred to is distorted in a manner to cause the sleeve to be rigidly secured to the hub so that relative turning movement of said parts is thereafter prevented. In the particular construction herein shown, by the use of a proper tool clips 44 are formed on the edge of the counterbore and at the same time they are forced into notches in the hub 21 thereby creating keys, as shown in Figure 8.

The arrangement herein described is such that the entire bearing of the rotating parts is within the mount, the weight supporting frame, and the weights carried thereby being other wise unsupported, and yet the structure is such that cramping action is avoided and the parts rotate with the utmost freedom of action. The arrangement of the governor shaft with its support in the mount and also at its opposite end in the cross piece of the weight supporting frame is such that the shaft is extremely sensitive and readily responds to any pressure exerted by the toes 30 on the weights. Stop pins 49 are extended from the under surface of the cross piece 25 into position to receive the weights 28 and stop inward movement of the latter under the force of the spring 36.

An examination of Figures 1 and 6 shows that the boss 18 is provided with a flange at its outer side and the boss is inclined from the flange so that oil spattered upon the boss will be directed along the inclined surface toward the ports 20. An opening 48 is formed through the retainer for the outflow of excess oil that may accumulate within the housing.

As a means for manual operation of the actuating lever to open the throttle a lug 45 is extended from the tensioning lever 37 and has a small hole in which a wire or other flexible connection may be secured and extended to a manually operated device accessible to the operator of an engine equipped with the governor.

Each retainer 32 rests with its straight edge against a lip 46 formed in the base of one of the sides 24 of the weight supporting frame, and a holder formed by cutting into the upper edge of the retainer and bending a lip outwardly engages the nut for supporting the retainer and prevents said nut from rotating. This construction of the lip 46 and the holder enables a single screw bolt or nut to be employed in securing the retainer in place.

As hereinbefore described the primary means for securing the housing to the mount are the bolts extending through holes in the ears in the housing and mount for attaching the structure as to the case of an engine. However, as a means for temporarily securing said housing and mount together until such time as the structure may be installed in an operative position screws 50 are employed projecting through the mount into the housing and as shown in Figure 6.

In the arrangement shown in Figure 11 the recess in the head 27 of the governor shaft contains the ball bearings 40, but in place of the stud 41 a ball 51 traveling on the balls 40 is employed. Otherwise the structure is the same as that embodied in the other figures, the contact of the head 43 of the actuating lever being at one side of the axis of the ball 51 in its rotation on the ball bearings 40. This is a very effectual arrangement, most satisfactorily fulfilling all the requirements, and simplifying the construction to a minimum degree.

I claim:

1. A governor comprising a mount, a weight supporting frame rotatably supported in said mount and projecting from one side thereof and solely supported thereby, a driving member rotatably supported in said mount independently of said weight supporting frame, an initially loose connection between said supporting frame and said driving member for adjustment purposes, means for setting said connection to finally make it permanent and rigid, governor weights carried by said frame, an actuating member and a connection between said weights and said actuating member.

2. A governor comprising a mount, a weight supporting frame including a base rotatably secured in said mount and projecting from one side thereof and solely supported thereby, a driving sleeve rotatably supported in said mount independently of said base and initially loosely secured at one end for adjustment purposes and for simplicity in assembling the parts, in an opening therein, means for setting said connection to finally make it permanent and rigid, a driving member secured to the opposite end of said sleeve on the opposite side of the mount from said weight supporting frame, governor weights carried by said frame, an actuating member and a connection between said weights and said actuating member.

3. A governor comprising a mount, a weight supporting frame projecting from one side of the mount and including a hub solely rotatably supported by said mount, a driving member extending through the mount and initially loosely engaged with said hub, and rotatably supported independently thereof for simplicity in assembling the parts, means for permanently and rigidly setting said connection, a driver secured to said driving member on the opposite side of said mount from said frame, governor weights carried by said frame, an actuating member, and a connection between said weights and said actuating member.

4. A governor comprising a mount, a weight supporting frame including a hub rotatably secured in said mount, a driving sleeve projecting through the mount and screw threadedly engaged with said hub for initial adjustment purposes to provide simplicity in assembling the parts, means for finally permanently and rigidly securing said threaded engaging means against turning movement in said hub after adjustment thereof, a driving member secured to said sleeve on the opposite side of the mount from said hub, governor weights carried by said frame, an actuating member, and a connection between said weights and said actuating member.

5. A governor comprising a mount, a weight supporting frame insertable in said mount from one side thereof, rotatably secured therein and projecting on one side thereof, driving means located on the opposite side of said mount and insertable therein from this side of the mount, rotatably supported thereby and operatively connected with said frame, a governor shaft supported at one end in said mount and having an enlarged head at its opposite end loosely supported in said frame, governor weights carried by said frame and having toes underlying said head and overlapping one another on opposite sides of said shaft for operation thereof, an actuating member, and a connection between said shaft and said actuating member.

6. A governor comprising a mount, a weight supporting frame rotatably supported in said mount and projecting on one side thereof, said frame including side parts and a cross piece, driving means rotatably supported by said mount and operatively connected with said frame, a governor shaft supported at one end in said mount and including a separately formed enlarged head secured at its opposite end and loosely supported in said cross piece, governor weights carried by said frame, an operative connection between said weights and head for operation of the latter, an actuating member, and a connection between said head and said actuating member.

7. A governor comprising a mount, a weight supporting frame rotatably secured in said mount and projecting on one side thereof and including a hub with side parts projecting therefrom and a cross piece connecting the outer ends of the side parts, means connected with said hub for rotating said frame, governor weights carried by said frame between said side parts, said weights being notched to receive said cross piece, a governor shaft supported at one end in said mount and operatively connected with said weights, an actuating member, and a connection between said shaft and said actuating member.

8. A governor comprising a mount, a weight supporting frame rotatably secured in said mount and projecting from one side thereof and including side parts, means for rotating said frame, pins projecting into said side parts and across the space separating them, a retainer secured to the outer surface of the side parts and overlying said pins to retain them in place, governor weights pivotally mounted on said pins, an actuating member and an operative connection between said weights and said actuating member.

9. A governor comprising a mount, a weight supporting frame adjustably secured in said mount and projecting on one side thereof, means for rotating said frame, governor weights carried by said frame, pins projecting inwardly from the top of said frame to receive said weights and limit inward movement thereof, an actuating member, and a connection between said weights and said actuating member.

10. A governor comprising a mount, a weight supporting frame rotatably secured in said mount, weights carried by said frame, a governor shaft supported for endwise movement in said frame and operatively connected with said weights, a ball bearing at the end of said shaft and including a single member having a spherical surface, and an operating arm in contact with said spherical surface on a radius thereof.

11. A governor comprising a mount, a weight supporting frame rotatably secured in said mount, weights carried by said frame, a governor shaft supported for endwise movement in said frame and operatively connected with said weights, a ball bearing having its axis coincident with that of said shaft and including a projecting stud, and an operating arm having a beveled surface in contact with said stud on a radius thereof.

12. A governor comprising a mount, a weight supporting frame rotatably secured in said mount, weights carried by said frame, a governor shaft supported for endwise movement in said frame and having a recess in its end, a ball bearing located in said recess with its axis coincident with that of the shaft and including a projecting stud with a rounded end, and an operating arm having a beveled surface in contact with said stud at one side of the axial center thereof.

13. A governor comprising a mount, a driving sleeve rotatably supported in said mount and projecting on opposite sides thereof and having a flange at its outer end, a driving gear resting against said flange and secured to said sleeve, a weight supporting frame initially loosely connected with said sleeve on the opposite side of said mount, means for rendering said connection permanently rigid, governor weights carried by said frame, a governor shaft supported by said sleeve and operatively engaged with said weights, an actuating member, and a connection between said weights and said actuating member.

14. A governor comprising a mount adapted for attachment to the case of an engine and having an oil port therethrough with its inlet mouth within the chamber in said engine case for reception of oil from within the engine case, a driving member secured to said mount for location in said engine case, a driver secured to said driving member, a governor frame initially loosely connected to said driving member, means for rendering said connection permanently rigid, governor weights carried by said frame, an actuating member, and a connection between said weights and said actuating member.

IRVING M. CRAFTS.